United States Patent [19]
Fujita et al.

[11] Patent Number: 5,271,664
[45] Date of Patent: Dec. 21, 1993

[54] RIM-FITTED TIRE AND METHOD OF CORRECTING WEIGHT UNBALANCE THEREOF

[75] Inventors: Kazuto Fujita; Mitsunori Wada, both of Kodaira; Masahiro Takayama, Hamura, all of Japan

[73] Assignee: Bridgestone Corporation, Tokyo, Japan

[21] Appl. No.: 904,588

[22] Filed: Jun. 26, 1992

[30] Foreign Application Priority Data

Jul. 6, 1991 [JP] Japan .................. 3-192499

[51] Int. Cl.$^5$ ............................. B60C 19/00
[52] U.S. Cl. .................. 301/5.22; 152/154.1; 156/75
[58] Field of Search .............. 152/154.1; 156/75; 301/5.21, 5.22; 73/457, 459, 462, 468–470

[56] References Cited

U.S. PATENT DOCUMENTS

| 3,462,198 | 8/1969 | Onufer . | |
|---|---|---|---|
| 4,068,532 | 1/1978 | Green et al. . | |
| 5,120,113 | 6/1992 | Oyama et al. | 301/5.22 |
| 5,171,067 | 12/1992 | Kawabe et al. | 301/5.21 |

FOREIGN PATENT DOCUMENTS

| 0454393 | 10/1991 | European Pat. Off. . |
|---|---|---|
| 1914321 | 7/1977 | Fed. Rep. of Germany . |
| 60-76401 | 4/1985 | Japan . |

OTHER PUBLICATIONS

"Gisholt Method of Balancing"; pp. 13–15; Gisholt Machine Company; 1926.

Primary Examiner—Michael W. Ball
Assistant Examiner—Nancy T. Krawczyk
Attorney, Agent, or Firm—Oliff & Berridge

[57] ABSTRACT

In a rim-fitted tire, a plurality of static unbalance correction weights are fixed in such a manner as to be distributed on both sides of a reference plane substantially perpendicular to the axial direction of a rim, and a plurality of dynamic unbalance correction weights, corresponding to amounts of correction of dynamic unbalance obtained with the static unbalance correction weights fixed, are fixed, thereby correcting weight unbalance.

14 Claims, 5 Drawing Sheets

RIM-FITTED TIRE AND METHOD OF CORRECTING WEIGHT UNBALANCE THEREOF

BACKGROUND OF THE INVENTION

1. Field of the Invention

The present invention relates to a rim-fitted tire whose weight unbalance is corrected and a method of correcting a weight unbalance of a rim-fitted tire.

2. Description of the Related Art

It is well-known that vibrations occur if a rim-fitted tire with unbalanced weight is rotated. Such a weight unbalance includes a static unbalance in which the weight is determined without rotating the rim-fitted tire and a dynamic unbalance which occurs only when the tire is rotated.

As a method of correcting such an unbalance, a method is known in which the static unbalance is first corrected, and the dynamic unbalance is then corrected by using a separate balance weight while the tire (rim-fitted tire) is being rotated. Nowadays, however, a method is mainly adopted in which the rim-fitted tire is mounted on a measuring machine (wheel balancer) and is rotated to measure the amount of unbalance requiring correction, and one balance weight is fixed at one location on each of observe and reverse rim flanges on the basis of that measurement. In this way, the static unbalance and the dynamic unbalance are corrected simultaneously (simultaneous correction method).

However, since the amount of unbalance of the rim-fitted tire is measured while the tire is being rotated on a balancer shaft above the ground, this method of simultaneously correcting the weight unbalance of the rim-fitted tire has the drawback that no consideration is given to the ground-contacting condition in which the rim-fitted tire is actually used. In addition, this weight unbalance exhibits a certain distribution in the rim-fitted tire, and it is readily conceivable that the unbalance is not concentrated on one location. When the unbalance is actually corrected, however, the unbalance is corrected by fixing one balance weight at one location on each of the obverse and reverse rim flanges.

Since this method of correction ignores the fact that the tire actually rotates in contact with the ground, as mentioned above, this method of correction cannot necessarily be said to be satisfactory.

A more specific description will be given with reference to FIG. 2. FIG. 2 is a schematic diagram showing a front elevational view and a side elevational view of the rim-fitted tire, in which the rim-fitted tire rotates on the balancer shaft, and a weight $W_a$ is fixed at a location a indicated by the balancer. Namely, this shows that a point of excessive weight lies at a location b which is radially opposite to the location a.

In a case where the tire is rotated in this state, the centrifugal forces of the rim-fitted tire are balanced. In other words, the resultant of the centrifugal forces becomes zero. Therefore, this balance does not hold when the tire is actually in contact with the ground.

FIG. 3 shows a condition in which such a tire is mounted on an actual vehicle and is in contact with the ground. That is, at the points a and b which are located on a line passing through the center of the rim, in a case where the point b side is in contact with the ground, the position of the point b changes due to the deformation of the tire during contact with the ground, so that the balance between the weight at the point b and the weight at the point a becomes unbalanced. As a result, vertical vibration (indicated by arrow A) and horizontal vibration (i.e., moment indicated by arrow B) occur in the tire.

To sum up the above-described point, it can be seen that although in accordance with the conventional balancing method the vibration can be controlled to a certain extent, a basic solution is not offered since no consideration is given to the balance in the condition in which the tire is grounded.

SUMMARY OF THE INVENTION

Accordingly, it is an object of the present invention to provide a rim-fitted tire and a method of correcting the weight unbalance of a rim-fitted tire in which vertical and horizontal vibrations constituting sources of vibration of the tire are reduced to a minimum in a situation where the tire is actually used, thereby overcoming the above-described drawback of the conventional art.

To this end, the rim-fitted tire whose weight unbalance is corrected in accordance with the invention comprises: a plurality of static unbalance correction weights fixed in such a manner as to be distributed on both sides of a reference plane substantially perpendicular to an axial direction of a rim; and a plurality of dynamic unbalance correction weights respectively fixed to opposite end faces of the rim as viewed in the axial direction of the rim.

In addition, the method of correcting the weight unbalance of a rim-fitted tire in accordance with the present invention comprises the steps of: determining a magnitude of an amount of correction of static unbalance of the rim-fitted tire and a position in a circumferential direction of a rim for correcting static unbalance; dividing the amount of correction of static unbalance such that divided amounts of correction of static unbalance are distributed on both sides of a reference plane substantially perpendicular to an axial direction of the rim without changing a position of the amount of correction of static unbalance in a circumferential direction of the rim, and fixing static unbalance correction weights of the weight respectively corresponding to magnitudes of the divided amounts of correction of static unbalance; determining magnitudes of amounts of correction of dynamic unbalance of the rim-fitted tire and positions of correction of dynamic unbalance in a state in which the static unbalance correction weights are fixed; and fixing dynamic unbalance correction weights of the weight respectively corresponding to the magnitudes of the amounts of correction of dynamic unbalance, at the positions of correction of dynamic unbalance.

In the case of a conventional method of simultaneous correction, as already described in connection with FIG. 2, an unbalance correction weight Wa for simultaneously correcting static unbalance and dynamic unbalance is fixed at the position a on the rim which is indicated by the measuring machine. In this state, the centrifugal forces are balanced with the rim as a center, so that no problem occurs.

However, as shown in FIG. 3, when the balance weight at the point a is rotated away from the ground-contacting surface, the point b comes to contact the ground, so that the centrifugal forces change due to the weight at the point b. Hence, the balance with the weight Wa at the point a becomes unbalanced. Accordingly, when the tire rotates in contact with the ground, the centrifugal forces change each time the tire rotates, with the result that the vertical and horizontal vibrations occur in the tire. It should be noted that, in the drawings, T, R, and R denote the tire, the rim, and the ground, respectively.

The vertical and horizontal vibrations are caused by the centrifugal forces. If the static unbalance correction weights are fixed in such a manner as to be distributed on both sides of the reference plane substantially perpendicular to the axial direction of the rim, it is possible to cause the resultant of the centrifugal forces acting on the static unbalance correction weights to pass through the reference plane, and to control the generation of the moment which causes the vertical and horizontal vibrations.

That is, by correcting the static unbalance and the dynamic unbalance separately, the dynamic unbalance correction weights can be made lightweight. At the same time, by fixing the static unbalance correction weights in such a manner that they are distributed on both sides of the reference plane, it is possible to suppress the vibrations occurring in a state in which the tire is in contact with the ground.

Accordingly, in the present invention, unlike the conventional method of simultaneous correction, the unbalance correction is separated into static unbalance correction and dynamic unbalance correction, and the static unbalance correction weights and the dynamic unbalance correction weights are fixed separately. More specifically, the amount of correction of static unbalance is divided, and the static unbalance correction weights respectively corresponding to the divided amounts of correction of static unbalance are fixed in such a manner as to be distributed on both sides of the reference plane substantially perpendicular to the axial direction of the rim.

In the present invention, since the static unbalance correction weights are fixed in such a manner as to be distributed on both sides of the reference plane, the resultant of the centrifugal forces acting on the static unbalance correction weights substantially passes through the reference plane. Accordingly, even if the position of the unbalanced portion changes due to the deformation of the tire in contact with the ground, the centrifugal forces or the resultant thereof acting on the static unbalance correction weights is not offset substantially from the reference plane. Hence, the vertical and horizontal vibrations can be reduced to a minimum.

Although the reference plane can be set in such a manner as to pass through the center of the rim, the rim-fitted tire vibrates vertically and horizontally about the position of a bearing of an axle on which the rim-fitted tire is mounted. Accordingly, by setting the reference plane in such a manner as to pass through the position of this bearing, the vertical and horizontal vibrations can be reduced more effectively. In addition, if the positions and the weight of the static unbalance correction weights are determined in such a manner that a sum of moments about a center of the reference plane acting on the static unbalance correction weights becomes zero or a value in the neighborhood of zero, even if the position of the unbalanced portion changes due to the deformation of the tire in contact with the ground, the sum of these moments becomes zero or a value in the neighborhood of zero. Hence, the vertical and horizontal vibrations can be reduced more effectively.

If the wheel width is assumed to be A mm, the aforementioned bearing of the axle is generally located approximately 0-A/5 mm inwardly of the center of a tire assembly, i.e., as viewed in the axial direction of the rim. It should be noted that the term "inwardly" referred to herein and in the appended claims refers to the direction oriented toward the center of the axle. In addition, since the length of this bearing is approximately 40 mm, a position located 0-A/5 mm±20 mm inwardly of the center of the tire is preferably adopted as the position of the reference plane. More preferably, the static unbalance correction weights are fixed symmetrically about this reference plane so as to set the left and right moments to be equal.

As described above, in accordance with the present invention, the static unbalance correction weights and the dynamic unbalance correction weights are fixed separately, and the static unbalance correction weights are fixed in such a manner as to be distributed on both sides of the reference plane. Accordingly, it is possible to minimize the vertical and horizontal vibrations constituting the sources of vibration in the tire, and to improve the performance in riding comfort concerning vibration to such a measure that a driver having ordinary driving skills can discern a difference in the performance.

The other objects, features and advantages of the present invention will become more apparent from the following detailed description of the invention when read in conjunction with the accompanying drawings.

DESCRIPTION OF THE PREFERRED EMBODIMENT

Figure 1:
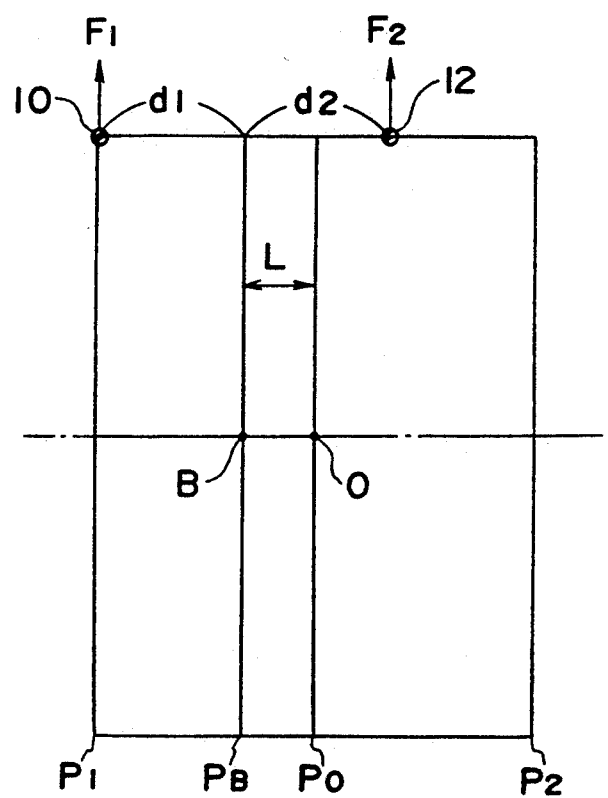
FIG. 1 is a diagram illustrating a basic principle of the present invention.
Figure 2:
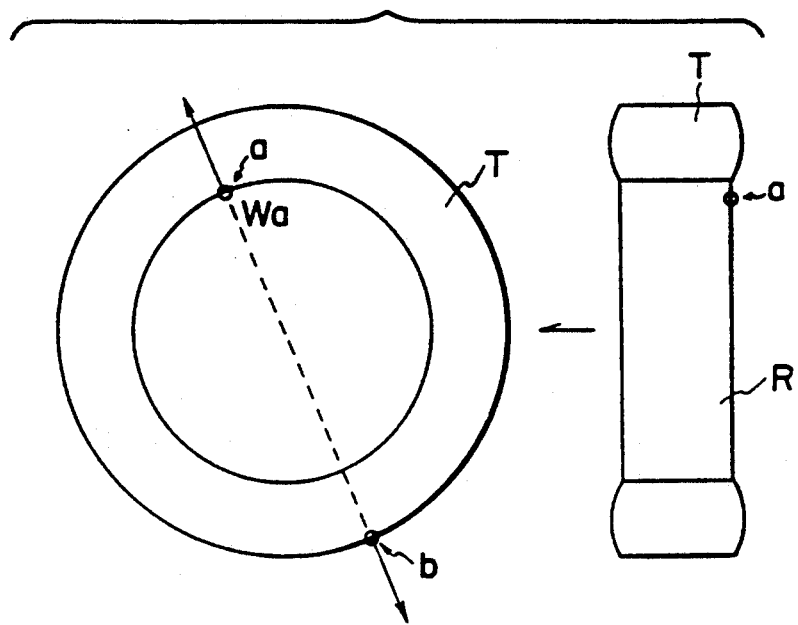
FIG. 2 is a schematic diagram illustrating the behavior of a tire whose unbalance is corrected by a conventional method when the tire is not in contact with the ground.
Figure 3:
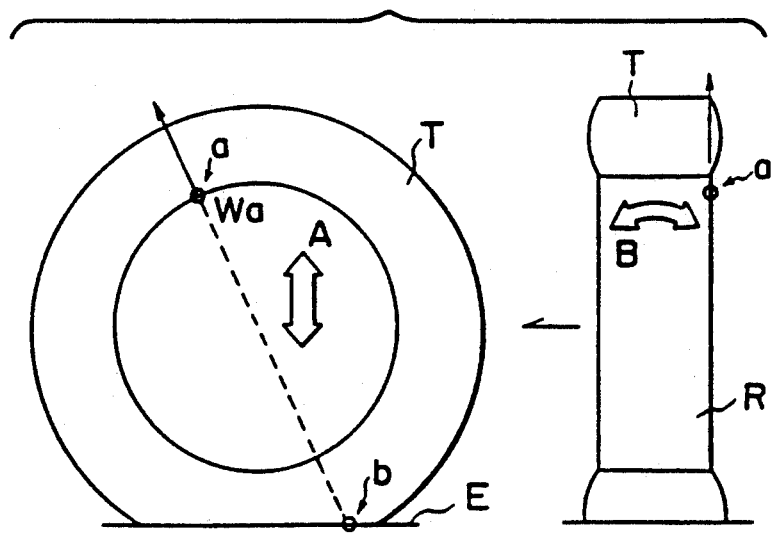
FIG. 3 is a schematic diagram illustrating the behavior of the tire whose unbalance is corrected by the conventional method when the tire is in contact with the ground.

Referring first to FIG. 1, a description will be given of a basic principle of the present invention. In this drawing and others that follow, the illustration of the tire portion of a rim-fitted tire is omitted, and only the rim is schematically shown.

As shown in FIG. 1, it is assumed that the planes of opposite end faces of the rim of the rim-fitted tire are a first plane (inner plane) $P_1$ and a second plane (outer plane) $P_2$, respectively, and a plane parallel with the first and second planes $P_1$ and $P_2$ and passing through a center O of the rim is a rim center plane $P_0$. In addition, it is assumed that a plane which is spaced apart a predetermined distance L from the rim center plane $P_O$ toward the first plane $P_1$ and is parallel with the rim center plane $P_O$ is $P_B$. The unbalance of the rim-fitted tire includes the static unbalance and the dynamic unbalance. In the present invention, the static unbalance and the dynamic unbalance are corrected separately. The static unbalance occurs when the center of gravity of the rim-fitted tire is not present on the axis of rotation of the tire. To correct this static unbalance, it suffices if an amount of correction of static unbalance equivalent to the weight of an unbalance, i.e., a balance weight, is fixed at an opposite position (on the 180° opposite side) to the side where the unbalance occurs. In the present invention, this amount of correction of static unbalance is divided into two, and static unbalance correction weights 10, 12 of the weight corresponding to the divided amounts of correction of static unbalance are fixed with the reference plane $P_B$ located therebetween.

It is now assumed that distances from the respective two static unbalance correction weights 10, 12 to the reference plane $P_B$ are $d_1$, $d_2$, respectively, and that centrifugal forces acting on the static unbalance correction weights when the rim-fitted tire rotates are $F_1$, $F_2$. Then, the sum of moments acting on the static unbalance correction weights 10, 12 about a center B in the reference plane $P_B$ is $$F_1 \cdot d_1 - F_2 \cdot d_2$$

Accordingly, if the weight of the static unbalance correction weights 10, 12 and the distances $d_1$, $d_2$ from the static unbalance correction weights 10, 12 to the reference plane $P_B$ are determined such that the sum of these moments becomes zero or a value in the neighborhood of zero, the resultant of the centrifugal forces virtually passes through the reference plane Ps. Hence, even if the position of the unbalance changes due to the contacting of the tire with the ground, the sum of moments does not change substantially, thereby making it possible to reduce the vertical vibration and the horizontal vibration.

Since it is sufficient to determine the weight of the static unbalance correction weights 10, 12 and the distances $d_1$, $d_2$ from the static unbalance correction weights 10, 12 to the reference plane $P_B$ such that the sum of moments becomes zero or a value in the neighborhood of zero, if the weight of the static unbalance correction weight 10 is made greater than the weight of the static unbalance correction weight 12, and the distance $d_2$ is made greater than the distance $d_1$, the static unbalance correction weights 10, 12 can be fixed in the first plane $P_1$ and the second plane $P_2$, respectively.

If the wheel width is assumed to be A mm, the bearing of an axle on which the rim-fitted tire is mounted is generally located approximately 0–A/5 mm inwardly of the center of the tire assembly as viewed in the axial direction of the rim. In addition, the length of this bearing is approximately 40 mm, and since the tire vibrates vertically and horizontally with the position of the bearing as a center, 0–A/5 mm±20 mm can be adopted as the position of the reference plane. If the reference plane can be set to be identical to the central plane, the first planes P1 and the second plane P2 become symmetric about the reference plane. Hence, the static unbalance correction weights of the same weight can be fixed in the first plane P1 and the second plane P2.

Next, the dynamic unbalance is an unbalance caused by the moment which occurs when the tire is rotated in a state in which the static unbalance is established. This is the case where unbalances of the same weight (due to the fact that the static unbalance is absent) are present at positions offset 180° in the first plane P1 and the second plane P2, respectively. To correct these unbalances, the dynamic unbalance correction weights of the same weight as that of the unbalance are respectively fixed at opposite positions (on the 180° opposite side) to the side where the unbalance occurs in the first plane P1 and the second plane P2.

A subjective (feeling) evaluation test was conducted by using actual vehicles. The test item was the performance in riding comfort concerning vibration.

Specifically, the subjective test was conducted by using actual vehicles on the basis of a 100-point method with Comparative Example 1 serving as a reference, and points greater than 100 indicate the direction of improvement. The range of evaluation is such that a difference of five points allows a driver having ordinary driving skills to discern a difference in the performance.

As test vehicles, the following vehicle used.

Vehicle: Passenger car with a 1,600 cc engine mounted
Rim used: 5.1/2J×14
Tire size: 195/60R14 85H The method of correcting the unbalance of the weight of the rim-fitted tire is shown in Table 1 below.

TABLE 1

| Type of Tire | Weight of balance weight and position | Comparative Example 1 Static/dynamic balance weight $W_{o1}$ | Comparative Example 1 Static/dynamic balance weight $W_{o2}$ | Comparative Example 1 Static balance weight | Example 1 Dynamic balance weight $W_{21}$ | Example 1 Dynamic balance weight $W_{22}$ | Example 1 Static balance weight $W_{11}$ | Example 1 Static balance weight $W_{12}$ | Example 2 Dynamic balance weight $W_{21}$ | Example 2 Dynamic balance weight $W_{22}$ | Example 2 Static balance weight $W_{11}$ | Example 2 Static balance weight $W_{12}$ | Comparative Example 2 Dynamic balance weight $W_{21}$ | Comparative Example 2 Dynamic balance weight $W_{22}$ | Comparative Example 2 Static balance weight $W_2$ | Comparative Example 3 Dynamic balance weight $W_{21}$ | Comparative Example 3 Dynamic balance weight $W_{22}$ | Comparative Example 3 Static balance weight $W_2$ |
|---|---|---|---|---|---|---|---|---|---|---|---|---|---|---|---|---|---|---|
| 1 | Weight of balance weight (g) | 10 | 10 | — | 7 | 7 | 14 | 14 | 7 | 7 | 14 | 14 | 10 | 10 | 28 | 5 | 5 | 28 |
|   | Position (°) | 5 | 50 | — | 156 | 336 | 20 | | 156 | 336 | 20 | | 96 | 276 | 20 | 123 | 303 | 20 |
| 2 | Weight of balance weight (g) | 20 | 15 | — | 13 | 13 | 12 | 12 | 13 | 13 | 12 | 12 | 9 | 9 | 24 | 15 | 15 | 24 |
|   | Position (°) | 10 | 110 | — | 143 | 323 | 80 | | 143 | 323 | 80 | | 113 | 293 | 80 | 105 | 285 | 80 |

TABLE 1-continued

| Type of Tire | Weight of balance weight and position | Comparative Example 1 Static/dynamic blance weight | | Static balance weight | Example 1 | | | | Example 2 | | | | Comparative Example 2 Dynamic balance weight | | Static balance weight | Comparative Example 3 Dynamic balance weight | | Static balance weight |
|---|---|---|---|---|---|---|---|---|---|---|---|---|---|---|---|---|---|---|
| | | | | | Dynamic balance weight | | Static balance weight | | Dynamic balance weight | | Static balance weight | | | | | | | |
| | | $W_{o1}$ | $W_{o2}$ | | $W_{21}$ | $W_{22}$ | $W_{11}$ | $W_{12}$ | $W_{21}$ | $W_{22}$ | $W_{11}$ | $W_{12}$ | $W_{21}$ | $W_{22}$ | $W_2$ | $W_{21}$ | $W_{22}$ | $W_2$ |
| 3 | Weight of balance weight (g) | 15 | 10 | — | 8 | 8 | 10 | 10 | 8 | 8 | 10 | 10 | 6 | 6 | 20 | 10 | 10 | 20 |
| | Position (°) | 345 | 65 | — | 102 | 282 | | 35 | 102 | 282 | | 35 | 93 | 273 | 35 | 185 | 5 | 35 |
| 4 | Weight of balance weight (g) | 10 | 15 | — | 4 | 4 | 12 | 12 | 4 | 4 | 12 | 12 | 6 | 6 | 24 | 4 | 4 | 24 |
| | Position (°) | 270 | 300 | — | 52 | 232 | | 282 | 52 | 232 | | 282 | 124 | 304 | 282 | 62 | 242 | 282 |

It should be noted that the position (angle) where the balance weight was attached was measured clockwise as viewed from the outer side of the rim-fitted tire mounted on the vehicle, and a point of origin thereof was set as the valve position of the wheel.

The reference plane in Examples 1 and 2 was set in the center of the tire width, i.e., in the central plane.

Figure 4:
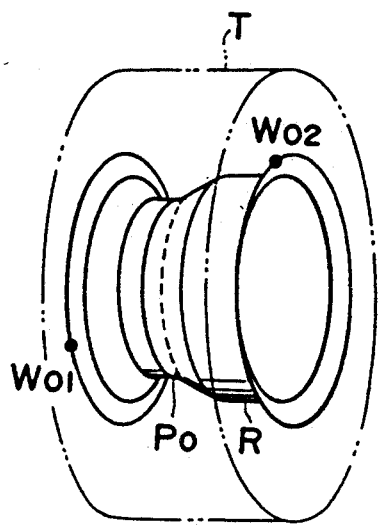
FIG. 4 is a perspective view illustrating positions where weights are fixed in Comparative Example 1.
Figure 5:
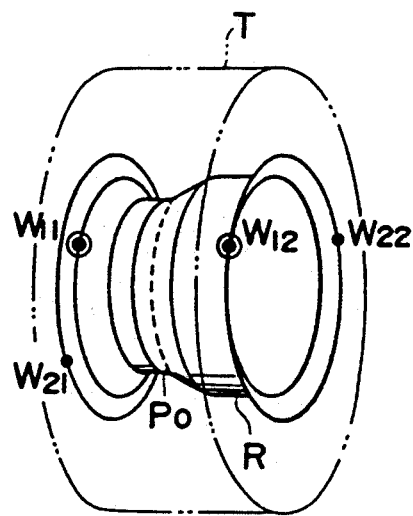
FIG. 5 is a perspective view illustrating positions where the weights are fixed in Example 1.
Figure 6:
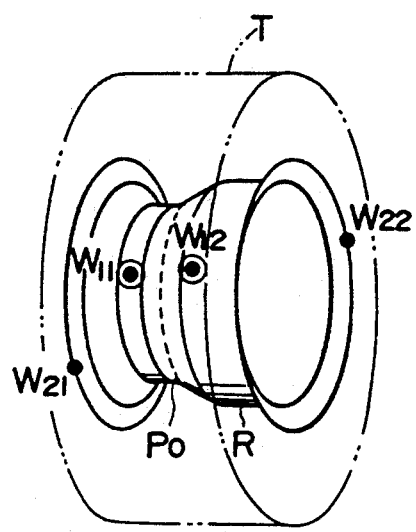
FIG. 6 is a perspective view illustrating positions where the weights are fixed in Example 2.
Figure 7:
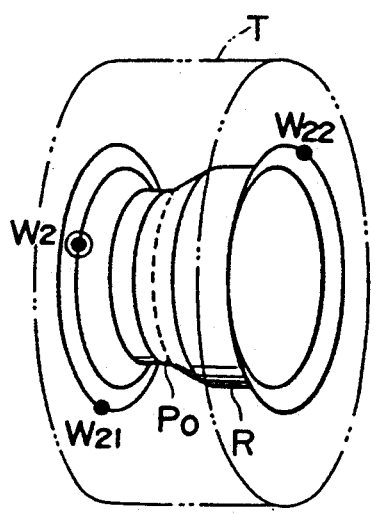
FIG. 7 is a perspective view illustrating positions where the weights are fixed in Comparative Example 3.
Figure 8:
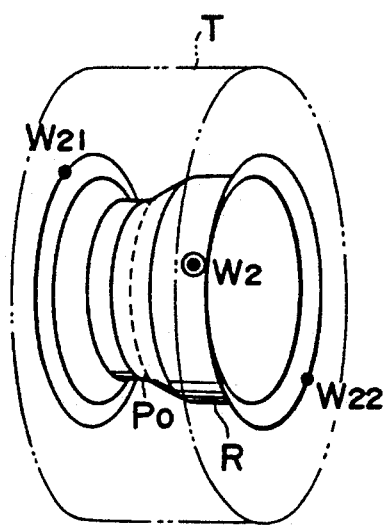
FIG. 8 is a perspective view illustrating positions where the weights are fixed in Comparative Example 2.

FIGS. 4, 7 and 8 are perspective views of tire assemblies illustrating the positions where the balance weights were fixed in Comparative Examples 1 to 3, and FIGS. 5 and 6 are perspective views of tire assemblies illustrating the positions where the balance weights were fixed in Examples 1 and 2.

The following are the characteristics regarding the positions where the balance weights were fixed in the respective examples.

Comparative Example 1 (FIG. 4): The conventional two-plane balancing method.

Comparative Example 2 (FIG. 8): The static unbalance was corrected on the outer flange.

Comparative Example 3 (FIG. 7): The static unbalance was corrected on the inner flange.

Example 1 (FIG. 5): The static unbalance was corrected uniformly on the outer and inner flanges with respect to the reference plane.

Example 2 (FIG. 6): The static unbalance was corrected uniformly on portions other than the flanges with respect to the reference plane.

The results of the test are shown in Table 2 below.

TABLE 2

| | Comparative Example 1 | Example 1 | Example 2 | Comparative Example 2 | Comparative Example 3 |
|---|---|---|---|---|---|
| Performance in riding comfort concerning vibration | 100 | 108 | 107 | 104 | 105 |

Examples 1 and 2 to which the present invention was applied show results which far surpassed those of the Comparative Examples, and it became evident that the present invention bring about the effect of improvement of a measure which can be discerned even by general drivers.

That is, as compared with the conventional method of correcting unbalance, in the tires whose unbalance is corrected in accordance with the method of the present invention, when the tires are mounted on the vehicle and rotate in contact with the ground, the horizontal vibration can be reduced. Consequently, the vibrations occurring in the tires are suppressed, thereby remarkably improving the riding comfort concerning vibration.

What is claimed is:

1. A rim-fitted tire whose weight unbalance is corrected, comprising:
   a plurality of static unbalance correction weights fixed in such a manner as to be distributed on both sides of a reference plane substantially perpendicular to an axial direction of a rim; and
   a plurality of dynamic unbalance correction weights respectively fixed to opposite end faces of said rim as viewed in the axial direction of said rim.

2. A rim-fitted tire according to claim 1, wherein said reference plane is set in such a manner as to pass through a position of a bearing of an axle on which said rim-fitted tire is mounted.

3. A rim-fitted tire according to claim 1, wherein said reference plane is set in such a manner as to pass through an axial center of said rim.

4. A rim-fitted tire according to claim 1, wherein said reference plane is set in such a manner that, if the width of said rim is assumed to be A mm, said reference plane passes through a position spaced apart 0–A/5 mm±20 mm inwardly, as viewed in an axial direction of said rim, of a central plane passing through a center of said rim.

5. A rim-fitted tire according to claim 1, wherein said static unbalance correction weights are disposed at symmetrical positions about said reference plane.

6. A rim-fitted tire according to claim 1, wherein said static unbalance correction weights have substantially the same weight.

7. A rim-fitted tire according to claim 1, wherein the positions and the weight of said static unbalance correction weights are determined in such a manner that a sum of moments about a center of said reference plane acting on said static unbalance correction weights becomes zero or a value in the neighborhood of zero.

8. A method of correcting the weight unbalance of a rim-fitted tire, comprising the steps of:

determining a magnitude of an amount of correction of static unbalance of said rim-fitted tire and a position in a circumferential direction of a rim for correcting static unbalance;

dividing the amount of correction of static unbalance such that divided amounts of correction of static unbalance are distributed at positions on both sides of a reference plane substantially perpendicular to an axial direction of said rim without changing a position of the amount of correction of static unbalance in a circumferential direction of said rim, and fixing static unbalance correction weights of the weight respectively corresponding to magnitudes of the divided amounts of correction of static unbalance at the positions of correction of static unbalance;

determining magnitudes of amounts of correction of dynamic unbalance of said rim-fitted tire and positions of correction of dynamic unbalance in a state in which said static unbalance correction weights are fixed; and fixing dynamic unbalance correction weights of the weight respectively corresponding to the magnitudes of the amounts of correction of dynamic unbalance at the positions of correction of dynamic unbalance. weight respectively corresponding to magnitudes of the divided amounts of correction of static unbalance;

determining magnitudes of amounts of correction of dynamic unbalance of said rim-fitted tire and positions of correction of dynamic unbalance in a state in which said static unbalance correction weights are fixed; and fixing dynamic unbalance correction weights of the weight respectively corresponding to the magnitudes of the amounts of correction of dynamic unbalance, at the positions of correction of dynamic unbalance.

9. A method of correcting the weight unbalance of a rim-fitted tire according to claim 8, wherein said reference plane is set in such a manner as to pass through a position of a bearing of an axle on which said rim-fitted tire is mounted.

10. A method of correcting the weight unbalance of a rim-fitted tire according to claim 8, wherein said reference plane is set in such an axial manner as to pass through a center of said rim.

11. A method of correcting the weight unbalance of a rim-fitted tire according to claim 8, wherein said reference plane is set in such a manner that, if the width of said rim is assumed to be A mm, said reference plane passes through a position spaced apart $0-A/5$ mm$\pm 20$ mm inwardly, as viewed in an axial direction of said rim, of a central plane passing through a center of said rim.

12. A method of correcting the weight unbalance of a rim-fitted tire according to claim 8, wherein said static unbalance correction weights are disposed at symmetrical positions about said reference plane.

13. A method of correcting the weight unbalance of a rim-fitted tire according to claim 8, wherein said static unbalance correction weights have substantially the same weight.

14. A method of correcting the weight unbalance of a rim-fitted tire according to claim 8, wherein the positions and the weight of said static unbalance correction weights are determined in such a manner that a sum of moments about a center of said reference plane acting on said static unbalance correction weights becomes zero or a value in the neighborhood of zero.

* * * * *